US012369526B1

(12) United States Patent
Xiong et al.

(10) Patent No.: US 12,369,526 B1
(45) Date of Patent: Jul. 29, 2025

(54) FLEXIBLE-RIGID INTEGRATED GRIPPER FOR HARVESTING FRUITS AND VEGETABLES IN BREAKING-OFF MANNER AND HARVESTING ROBOT

(71) Applicant: Intelligent Equipment Research Center, Beijing Academy of Agriculture and Forestry Sciences, Beijing (CN)

(72) Inventors: Ya Xiong, Beijing (CN); Lichao Yang, Beijing (CN); Yuanyue Ge, Beijing (CN); Sen Lin, Beijing (CN); Haitao Li, Beijing (CN); Liping Chen, Beijing (CN)

(73) Assignee: INTELLIGENT EQUIPMENT RESEARCH CENTER, BEIJING ACADEMY OF AGRICULTURE AND FORESTRY SCIENCES, Beijing (CN)

( * ) Notice: Subject to any disclaimer, the term of this patent is extended or adjusted under 35 U.S.C. 154(b) by 0 days.

(21) Appl. No.: 19/011,885

(22) Filed: Jan. 7, 2025

(30) Foreign Application Priority Data

Aug. 12, 2024 (CN) .............................. 202411098081

(51) Int. Cl.
*A01D 46/24* (2006.01)
*A01D 45/00* (2018.01)
*A01D 46/30* (2006.01)

(52) U.S. Cl.
CPC ........... *A01D 46/24* (2013.01); *A01D 45/006* (2013.01); *A01D 46/30* (2013.01)

(58) Field of Classification Search
CPC ...... A01D 46/24; A01D 46/30; A01D 46/253; A01D 45/006; B25J 9/142; B25J 15/12; B25J 15/0023
See application file for complete search history.

(56) References Cited

U.S. PATENT DOCUMENTS 3,347,587 A * 10/1967 Dahle .................... A01D 46/24
  294/98.1
3,574,386 A *  4/1971 Frost .................... B25J 15/0023
  294/98.1

(Continued)

FOREIGN PATENT DOCUMENTS

CN     10272956 A    10/2012
CN    104855045 A     8/2015
(Continued)

OTHER PUBLICATIONS

Office Action from CN 202411098081.3 dated Jan. 5, 2025. (4 pages).

(Continued)

*Primary Examiner* — Adam J Behrens
(74) *Attorney, Agent, or Firm* — Tutunjian & Bitetto, P.C.

(57) ABSTRACT

A flexible-rigid integrated gripper for harvesting fruits and vegetables in a breaking-off manner, and a harvesting robot. The flexible-rigid integrated gripper for harvesting fruits and vegetables in a breaking-off manner includes a base, a driving member, and a flexible harvesting mechanism. The flexible harvesting mechanism includes a rigid member, and a flexible body. The flexible body is internally provided with a mounting space in fit with the rigid member, and the rigid member is arranged in the mounting space. The flexible body is arranged on the base. In a direction away from the base, a thickness of a side wall of the flexible body gradually decreases, the mounting space gradually increases, and a flexible harvesting opening in fit with a fruit/vegetable is formed by an inner side surface of the flexible body.

14 Claims, 10 Drawing Sheets

(56) References Cited

U.S. PATENT DOCUMENTS

| | | | | |
|---|---|---|---|---|
| 4,663,925 | A * | 5/1987 | Terada | B25J 5/007 |
| | | | | 414/730 |
| 5,245,885 | A * | 9/1993 | Robertson | B25J 15/0023 |
| | | | | 92/92 |
| 5,263,753 | A * | 11/1993 | Breu | B25J 15/0206 |
| | | | | 294/196 |
| 5,385,080 | A * | 1/1995 | Suzumori | B25J 15/12 |
| | | | | 91/525 |
| 6,718,766 | B2 * | 4/2004 | Seto | F15B 15/18 |
| | | | | 92/48 |
| 7,331,273 | B2 * | 2/2008 | Kerekes | B62D 35/007 |
| | | | | 92/92 |
| 7,654,595 | B2 * | 2/2010 | Yokoyama | B25J 9/142 |
| | | | | 294/99.1 |
| 10,465,723 | B2 * | 11/2019 | Ilievski | B25J 9/1075 |
| 10,850,391 | B2 * | 12/2020 | Lessing | B25J 15/0023 |
| 11,298,833 | B2 * | 4/2022 | Hatano | B25J 15/12 |
| 11,458,640 | B2 * | 10/2022 | Hatano | B25J 15/10 |
| 11,584,002 | B2 * | 2/2023 | Lessing | B25J 9/1075 |
| 11,738,471 | B2 * | 8/2023 | Lessing | B25J 15/0023 |
| | | | | 294/208 |
| 11,738,893 | B2 * | 8/2023 | Curhan | B25J 15/12 |
| | | | | 53/251 |
| 11,965,491 | B2 * | 4/2024 | Song | F03G 7/0616 |
| 12,285,861 | B2 * | 4/2025 | Cardenas | B25J 9/142 |
| 2002/0157388 | A1 * | 10/2002 | Seto | F15B 15/103 |
| | | | | 60/325 |
| 2011/0089708 | A1 * | 4/2011 | Mankame | B25J 15/12 |
| | | | | 294/86.4 |
| 2015/0257839 | A1 * | 9/2015 | Vause | A61B 17/221 |
| | | | | 606/130 |
| 2015/0360372 | A1 * | 12/2015 | Schiettecatte | B25J 9/0015 |
| | | | | 156/60 |
| 2020/0215700 | A1 * | 7/2020 | Bao | B25J 15/12 |
| 2020/0324420 | A1 * | 10/2020 | Hatano | B25J 15/0023 |
| 2020/0338749 | A1 * | 10/2020 | Machida | B25J 9/023 |
| 2022/0219339 | A1 * | 7/2022 | Lessing | B25J 15/0023 |
| 2023/0330870 | A1 * | 10/2023 | Curhan | B25J 15/0253 |
| 2023/0405843 | A1 * | 12/2023 | Lessing | B25J 15/10 |
| 2024/0042623 | A1 * | 2/2024 | Chen | B25J 15/0023 |
| 2024/0246246 | A1 * | 7/2024 | Jens | B25J 15/12 |
| 2024/0284829 | A1 * | 8/2024 | Sauerwald | B25J 15/0023 |

FOREIGN PATENT DOCUMENTS

| | | | | |
|---|---|---|---|---|
| CN | 105856269 A | * | 8/2016 | |
| CN | 118901405 B | | 3/2025 | |
| EP | 4316749 A1 | * | 2/2024 | B25J 15/0023 |
| GB | 2357274 A | * | 6/2001 | B25J 15/0023 |
| WO | WO-2016172670 A1 | * | 10/2016 | B25J 15/0023 |
| WO | WO-2018092913 A1 | * | 5/2018 | B25J 15/08 |

OTHER PUBLICATIONS

Notification to Grant Patent Rights from CN 202411098081.3 dated Jan. 27, 2025 (1 page).

* cited by examiner

FLEXIBLE-RIGID INTEGRATED GRIPPER FOR HARVESTING FRUITS AND VEGETABLES IN BREAKING-OFF MANNER AND HARVESTING ROBOT

CROSS-REFERENCE TO RELATED APPLICATION

This patent application claims the benefit and priority of Chinese Patent Application No. 202411098081.3 filed with the China National Intellectual Property Administration on Aug. 12, 2024, the disclosure of which is incorporated by reference herein in its entirety as part of the present application.

TECHNICAL FIELD

The present disclosure relates to the technical field of agricultural machinery and equipment, and in particular to a flexible-rigid integrated gripper for harvesting fruits and vegetables in a breaking-off manner, and a harvesting robot.

BACKGROUND

Fruits and vegetables are rich in nutrients and are necessities in human life. Fruit and vegetable harvesting is a key link in the agricultural production chain. The existing fruit and vegetable harvesting operations are mainly completed by manpower, which has the problems of low efficiency, high cost, high labor intensity and the like.

In recent years, the fruit and vegetable harvesting has gradually developed towards mechanical automatic harvesting. However, due to complex growing environment, most fruits and vegetables, especially the fruits and vegetables with high economic value such as strawberries, blueberries and tomatoes, are easy to be damaged during picking, which puts forward higher requirements for the fruit and vegetable harvesting. The gripper for harvesting fruits and vegetables, as an end effector of the harvesting robot, is the core component directly contacting the target. Reasonable design is not only the key to ensure harvesting efficiency and harvesting quality, but also can simplify the requirements for other subsystems of the harvesting robot. At present, the most common harvesting form is clamping and grasping. Clamping and grasping, due to the small contact area, is difficult to grasp fruits and vegetables with complex shapes and fragile features stably and softly. Therefore, it is of a great significance to design a gripper capable of achieving stable and soft grasping for improving the mechanical automatic harvesting of fruits and vegetables.

SUMMARY

The present disclosure provides a flexible-rigid integrated gripper for harvesting fruits and vegetables in a breaking-off manner, and a harvesting robot, thus solving the problems of low manual harvesting efficiency, high cost, and high labor intensity in the prior art.

The present disclosure provides flexible-rigid integrated gripper for harvesting fruits and vegetables in a breaking-off manner, including a base, a driving member, and a flexible harvesting mechanism.

The flexible harvesting mechanism includes a rigid member and a flexible body; the flexible body is internally provided with a mounting space in fit with the rigid member, and the rigid member is arranged in the mounting space; the flexible body is arranged on the base; in a direction away from the base, a thickness of a side wall of the flexible body gradually decreases, the mounting space gradually increases, and a flexible harvesting opening in fit with a fruit/vegetable is formed by an inner side surface of the flexible body; when the flexible body is exhausted, a size of the flexible harvesting opening gradually reduces in the direction away from the base; and when the flexible body is inflated, the size of the flexible harvesting opening gradually increases in the direction away from the base.

The driving member is connected to the base, and configured to drive the base to move, thus harvesting a fruit/vegetable inside the flexible harvesting opening.

According to the flexible-rigid integrated gripper for harvesting fruits and vegetables in a breaking-off manner provided by the present disclosure, the flexible body includes multiple flexible cavity bodies which are circumferentially arranged; the rigid member includes multiple rigid rods, each of the flexible cavity bodies is provided with a flexible chamber which is internally arranged with a corresponding one of the rigid rods.

According to the flexible-rigid integrated gripper for harvesting fruits and vegetables in a breaking-off manner provided by the present disclosure, in the direction away from the base, a thickness of a side wall of each of the flexible cavity bodies gradually decreases, the flexible chamber gradually increases, a diameter of each of the rigid rods gradually increases; and a gap is reserved between a periphery of the corresponding one of the rigid rods and an inner wall of the flexible chamber.

According to the flexible-rigid integrated gripper for harvesting fruits and vegetables in a breaking-off manner provided by the present disclosure, an outer side, close to the base, of each of the flexible cavity bodies is provided with a flange, the gripper for harvesting fruits and vegetables in a breaking-off manner further includes a fixing member, and the flange is fixed to the base through the fixing member.

According to the flexible-rigid integrated gripper for harvesting fruits and vegetables in a breaking-off manner provided by the present disclosure, a gas vent hole is formed in a bottom of each of the flexible cavity bodies, and in communication with the flexible chamber; multiple first gas inlet holes are formed in the base, and gas vent holes are correspondingly in communication with the multiple first gas inlet holes one by one.

According to the flexible-rigid integrated gripper for harvesting fruits and vegetables in a breaking-off manner provided by the present disclosure, one end, away from the base, of each of the flexible cavity bodies is arranged in an arc shape.

According to the flexible-rigid integrated gripper for harvesting fruits and vegetables in a breaking-off manner provided by the present disclosure, the flexible-rigid integrated gripper for harvesting fruits and vegetables in a breaking-off manner further includes a blowing hood mounted on the base. The blowing hood is arranged around an outer side surface of the flexible body; and when the blowing hood is ventilated, a gas is able to flow on the outer side surface of the flexible body in the direction away from the base.

According to the flexible-rigid integrated gripper for harvesting fruits and vegetables in a breaking-off manner provided by the present disclosure, a second gas inlet hole is formed in the base, and in communication with an inside of the blowing hood.

According to the flexible-rigid integrated gripper for harvesting fruits and vegetables in a breaking-off manner provided by the present disclosure, the driving member includes a rotating motor, and the base is provided with a first side and a second side opposite to each other; the flexible harvesting mechanism is arranged on the first side, and the rotating motor is mounted on the second side; and the base is able to drive the flexible harvesting mechanism to rotate under driving of the rotating motor.

The present disclosure provides a harvesting robot, including a moving platform, and the flexible-rigid integrated gripper for harvesting fruits and vegetables in a breaking-off manner above. The driving member is mounted on the moving platform.

According to the flexible-rigid integrated gripper for harvesting fruits and vegetables in a breaking-off manner and the harvesting robot provided by the present disclosure, the flexible harvesting mechanism can achieve full-envelope grasping to a target fruit/vegetable, thus avoids pressing damage caused by the local extrusion of a clamping type gripper. The rigid member can provide enough bending rigidity to make the flexible body have the rigidity of bending and harvesting. The flexible body is small in overall size when contracting, but the flexible harvesting opening is large when the flexible body expands, thus supporting the flexible harvesting mechanism to go deep into clusters of fruits and vegetables to harvest the target fruits/vegetables with different sizes in a swallowing manner.

BRIEF DESCRIPTION OF THE DRAWINGS

To describe the technical solutions of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

REFERENCE NUMERALS

1—base; 11—first gas inlet hole; 12—second gas inlet hole; 2—driving member; 3—flexible harvesting mechanism; 31—flexible body; 311—flexible cavity body; 312—flange; 313—flexible harvesting opening; 32—gap; 321—rigid rod; 4—blowing hood; 5—fixing member; 51—outer pressing ring; 52—inner pressing ring; 6—target fruit/vegetable; 7—surrounding fruit/vegetable; 8—leave.

DETAILED DESCRIPTION OF THE EMBODIMENTS

To make the objectives, technical solutions and advantages of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the scope of protection of the present disclosure.

The growing environment of fruits and vegetables is complex, resulting that fruits and vegetables are in a highly unstructured and uncertain unknown environment. Although facility in agriculture has achieved standardized operation to a certain extent, due to random and diverse natural growth states of crops, complex spatial layout of branches and leaves of crops and fruits and the shapes of the fruits are also complex and diverse. When a harvesting robot is used to harvest the fruits/vegetables, the success rate of harvesting, the harvesting efficiency and the degree of damage of fruits, branches and leaves are key evaluation indexes. Therefore, the harvesting robot, during picking, should have a high adaptability to a harvesting object, less disturbance and destruction to the surrounding environment, and fruit and the vegetable objects, and can better suitable with the vulnerability of the harvesting object and the difference of individual shapes.

Figure 1:
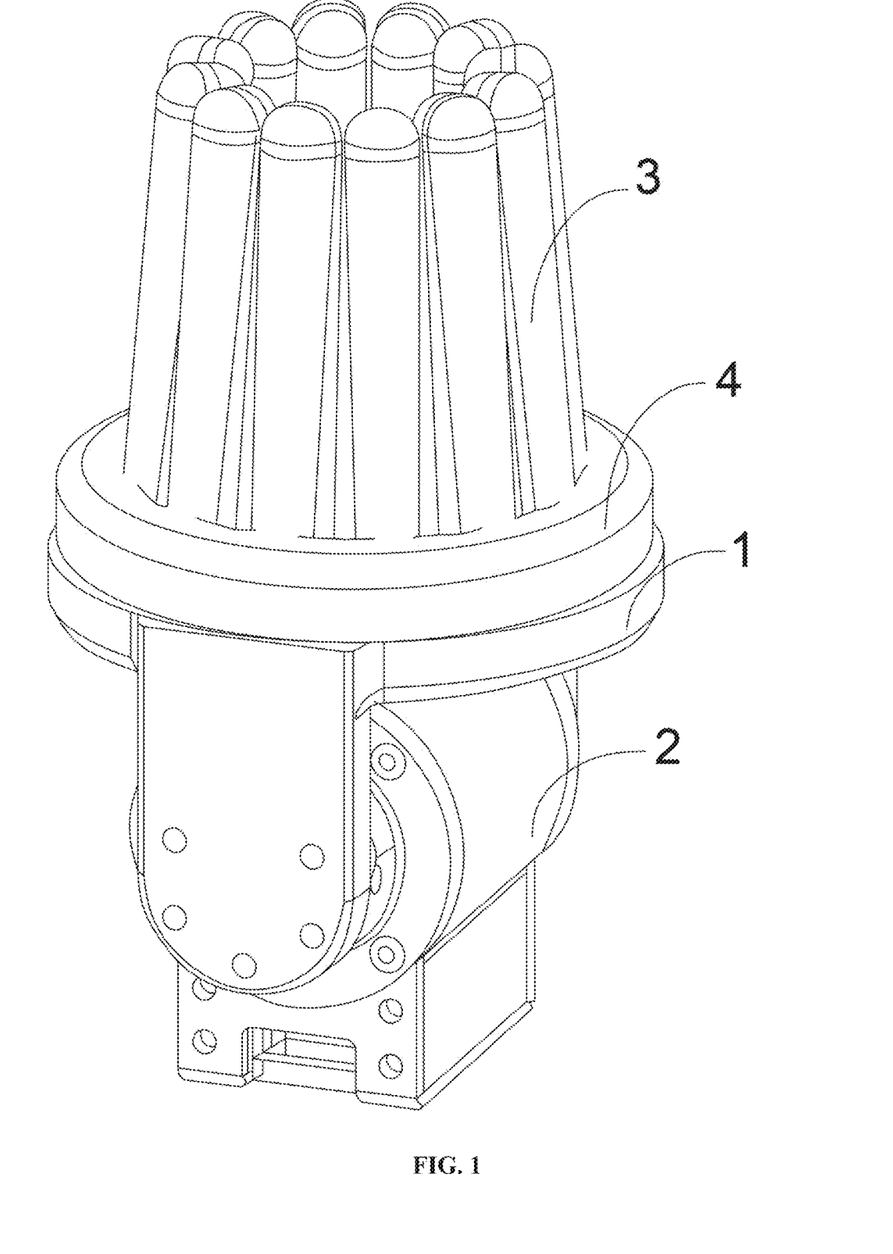
FIG. 1 is a schematic structural diagram I of a flexible-rigid integrated gripper for harvesting fruits and vegetables in a breaking-off manner according to the present disclosure.
Figure 2:
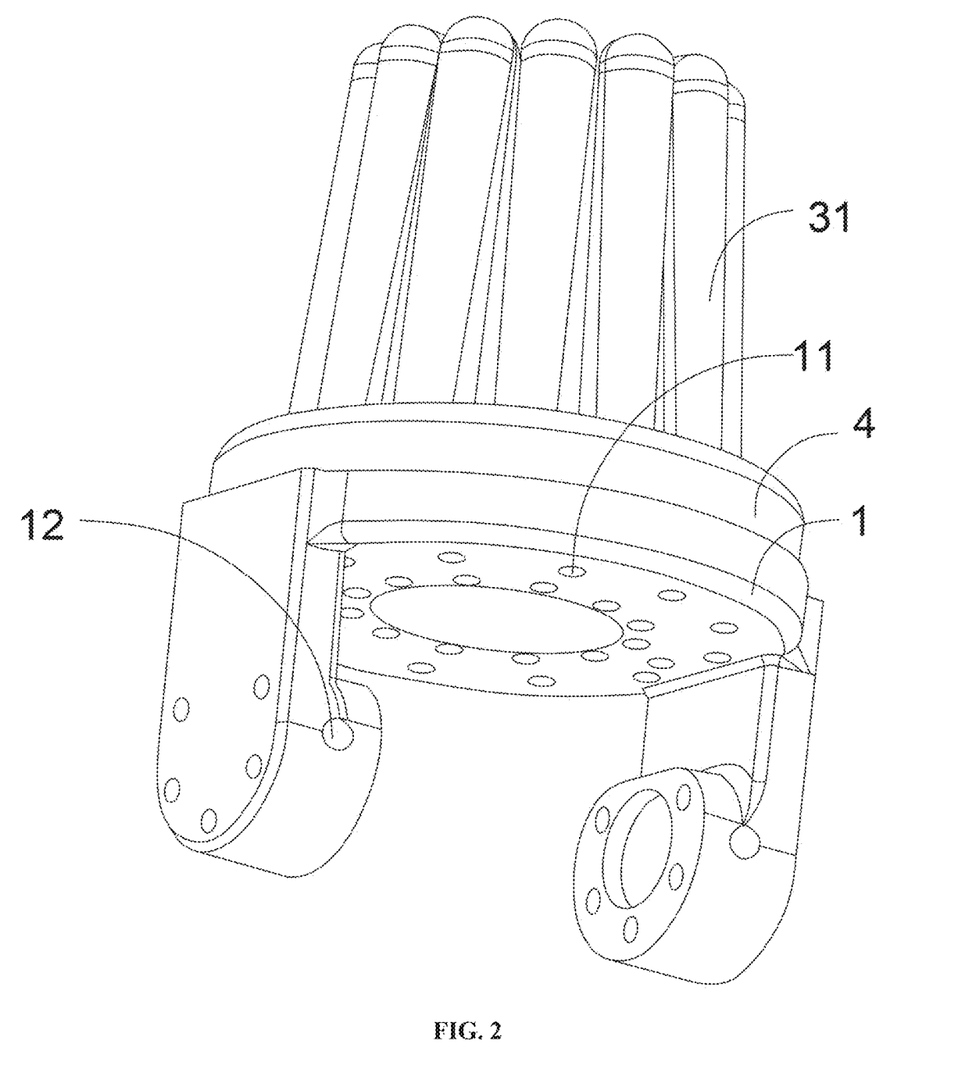
FIG. 2 is a schematic structural diagram II of a flexible-rigid integrated gripper for harvesting fruits and vegetables in a breaking-off manner according to the present disclosure.
Figure 4:
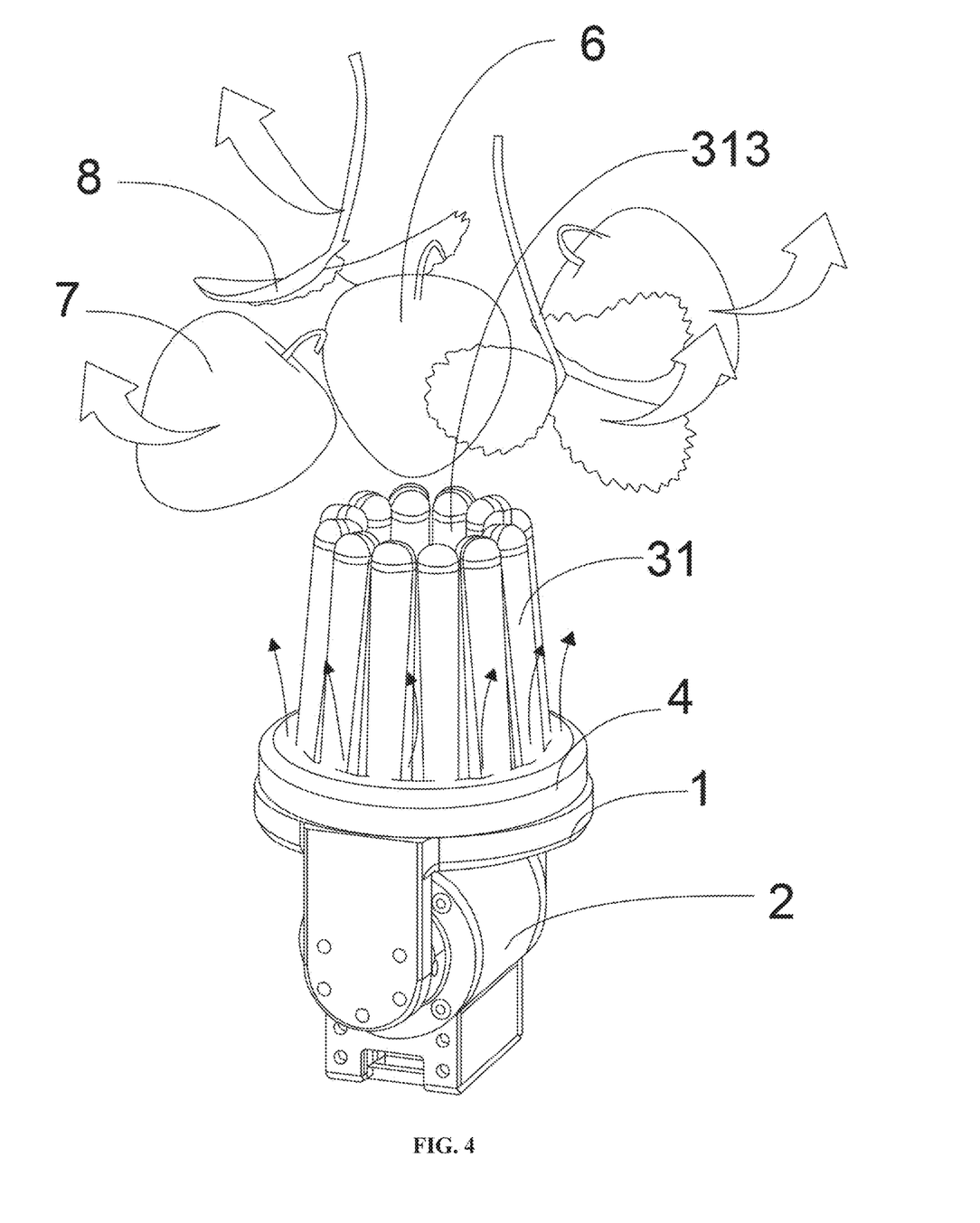
FIG. 4 is a schematic structural diagram III of a flexible-rigid integrated gripper for harvesting fruits and vegetables in a breaking-off manner according to the present disclosure.

As shown in FIG. 1, FIG. 2 and FIG. 4, embodiments of the present disclosure provide a flexible-rigid integrated gripper for harvesting fruits and vegetables in a breaking-off manner, including a base 1, a driving member 2, and a flexible harvesting mechanism 3. The flexible-rigid integrated gripper for harvesting fruits and vegetables in a breaking-off manner can be used for harvesting strawberries, tomatoes and other fruits and vegetables, which is not specifically limited here.

The flexible harvesting mechanism 3 includes a rigid member, and a flexible body 31. The flexible body 31 is internally formed with a mounting space in fit with the rigid member, and the rigid member is arranged in the mounting space. For example, the bottom of the rigid member is fixed to a bottom wall of the mounting space, there is an interval between the periphery of the rigid member and an inner wall of the mounting space, and the interval can be used to be filled with gas. The rigid member can move with the flexible body 31, for example, the rigid member can be switched to an inclined state from a vertical state.

Figure 5:
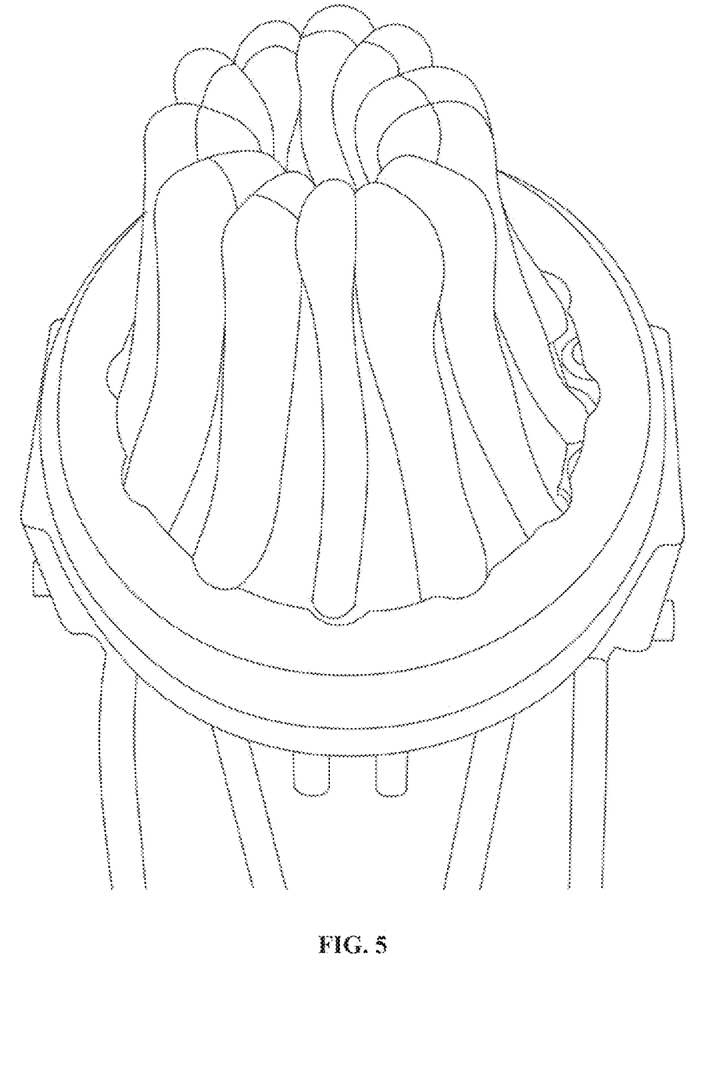
FIG. 5 is a schematic diagram I of an operating state of a flexible-rigid integrated gripper for harvesting fruits and vegetables in a breaking-off manner according to the present disclosure.
Figure 6:
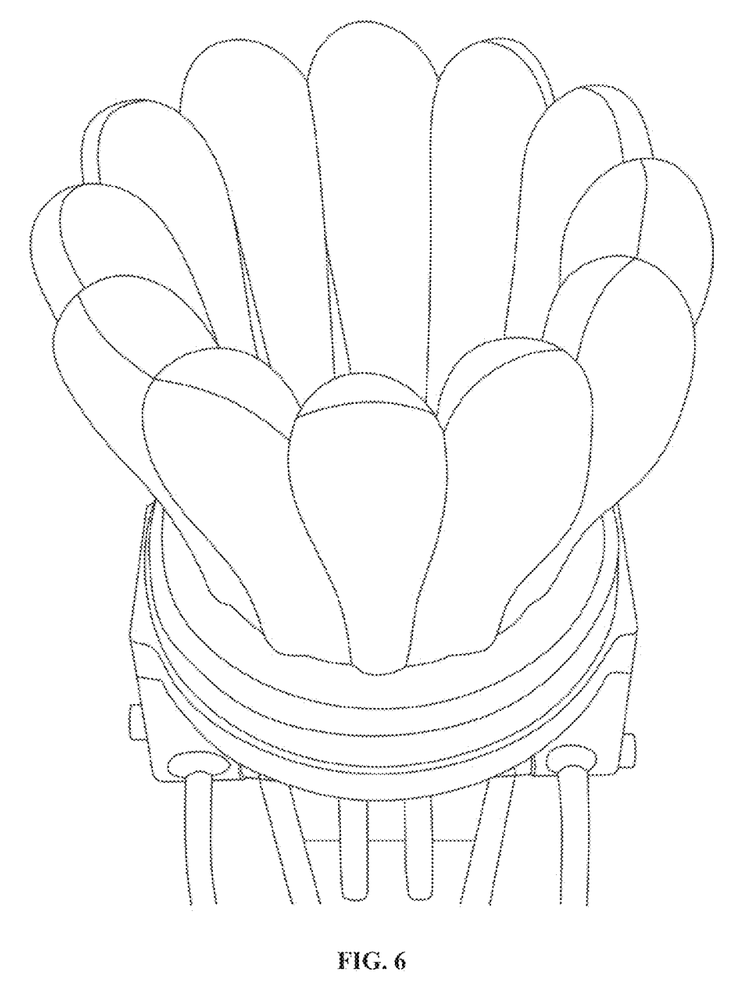
FIG. 6 is a schematic diagram II of an operating state of a flexible-rigid integrated gripper for harvesting fruits and vegetables in a breaking-off manner according to the present disclosure.
Figure 7:
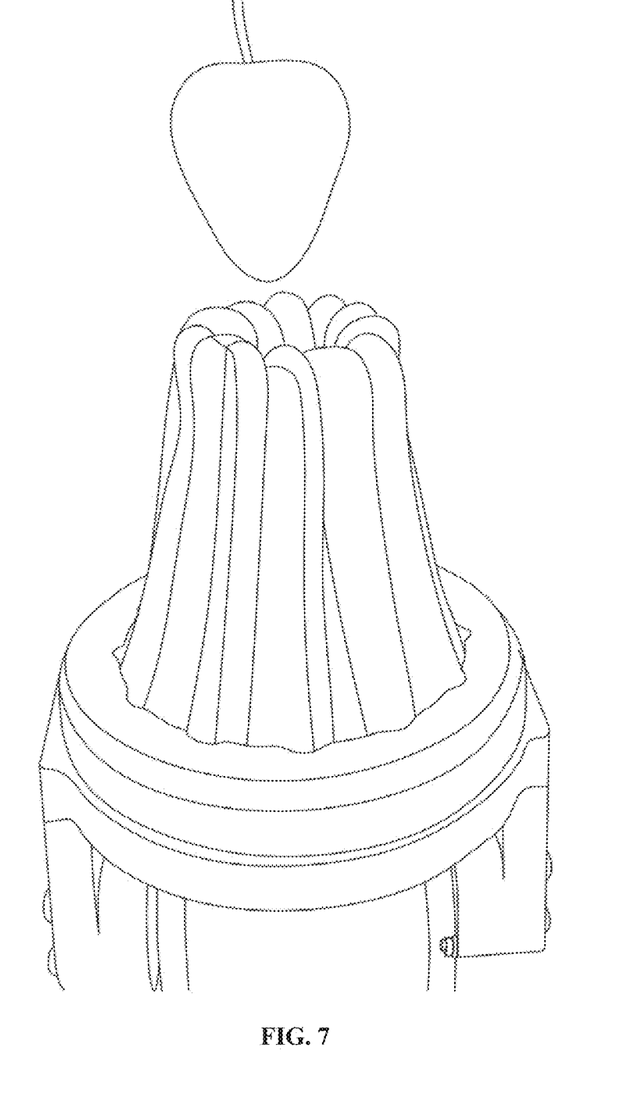
FIG. 7 is a schematic diagram I of a harvesting process of a flexible-rigid integrated gripper for harvesting fruits and vegetables in a breaking-off manner according to the present disclosure.
Figure 8:
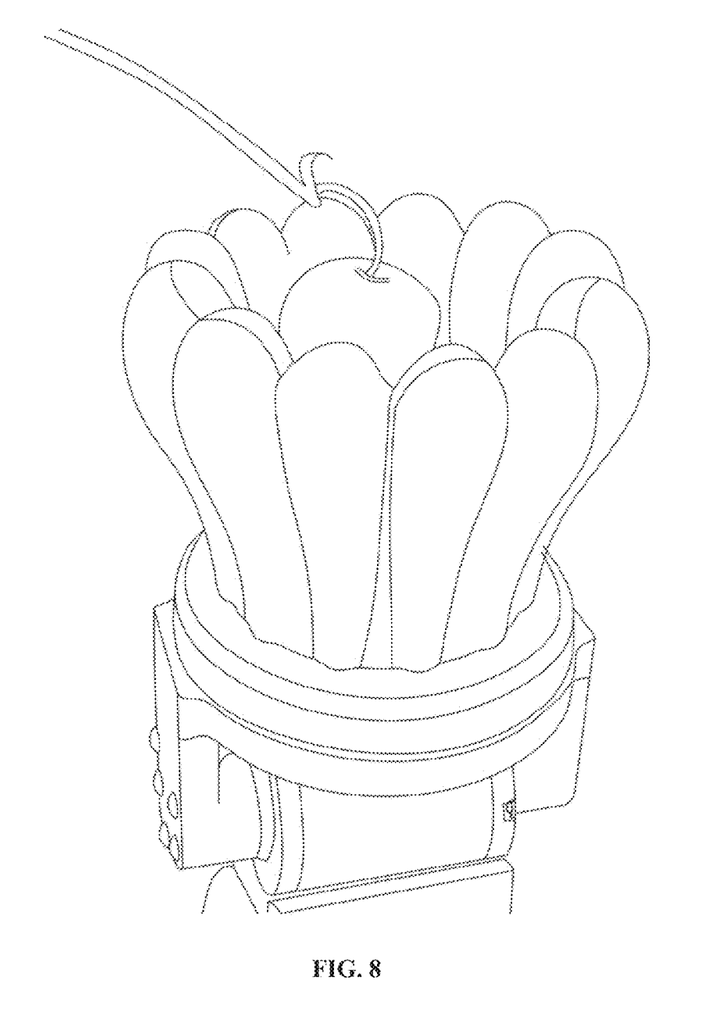
FIG. 8 is a harvesting schematic diagram II of a harvesting process of a flexible-rigid integrated gripper for harvesting fruits and vegetables in a breaking-off manner according to the present disclosure.
Figure 9:
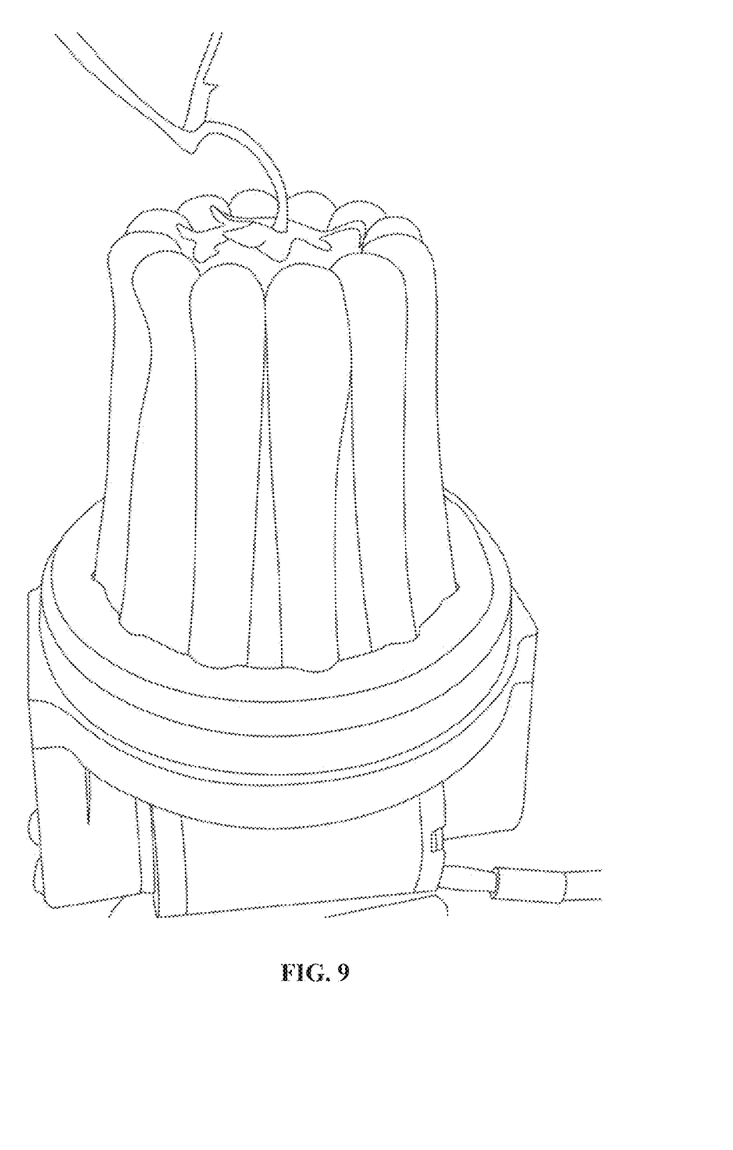
FIG. 9 is a harvesting schematic diagram III of a harvesting process of a flexible-rigid integrated gripper for harvesting fruits and vegetables in a breaking-off manner according to the present disclosure.
Figure 10:
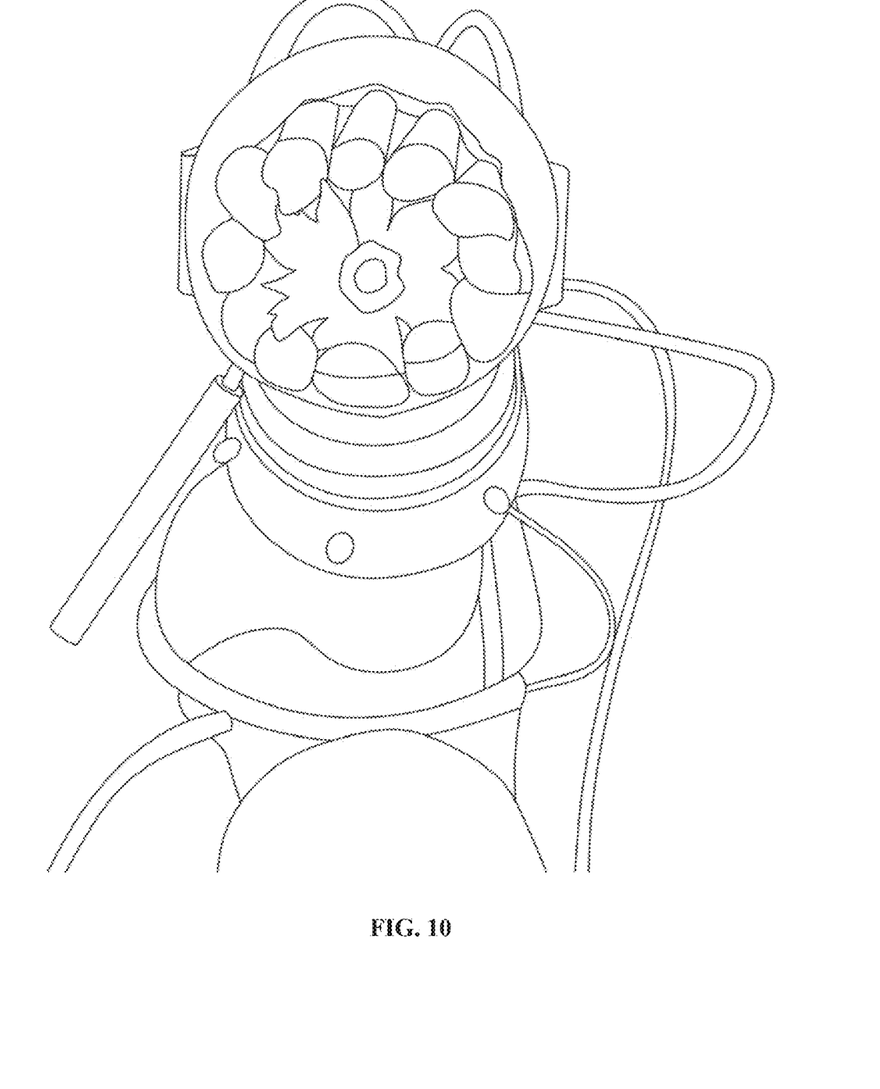
FIG. 10 is a harvesting schematic diagram IV of a harvesting process of a flexible-rigid integrated gripper for harvesting fruits and vegetables in a breaking-off manner according to the present disclosure.

In addition, as shown in FIG. 5 and FIG. 6, the flexible body 31 is arranged on the base 1. In a direction away from the base 1, a thickness of a side wall of the flexible body 31 gradually decreases, the mounting space gradually increases, and a flexible harvesting opening 313 in fit with fruits and vegetables is formed by an inner side surface of the flexible body 31. When the flexible body 31 is exhausted, the size of the flexible harvesting opening 313 gradually reduces in the direction away from the base 1. When the flexible body 31 is inflated, the size of the flexible harvesting opening 313 gradually increases in the direction away from the base 1. Exemplary, the flexible body 31 is inflated or exhausted through an external gas pump, or a manual pump. During inflation, the size of the flexible harvesting opening 313 is increased to facilitate the entering of the fruits and vegetables. During exhausting, the size of the flexible harvesting opening is reduced to clamp and fix the fruits and vegetables.

In addition, the driving member 2 is connected to the base 1, and configured to drive the base 1 to move, thus harvesting fruits and vegetables in the flexible harvesting opening 313.

During actual application, the rigid member may be a structure which is bendable but is difficult to be broken off, thus ensuring stability and durability in the harvesting process. The flexible body 31 is made of a resilient material, such as silica gel or polyurethane, thus having good flexibility and sealing performance. The flexible body 31 is internally provided with the mounting space in fit with the rigid member, and designed with an inflation/exhausting interface for adjusting the size of the flexible harvesting opening 313. An inner side surface of the flexible harvesting opening 313 is designed according to the shape of the target fruit/vegetable 6. For example, the flexible harvesting opening for the strawberries or tomatoes is designed as a circular or slightly oval opening, thus ensuring that the fruit and vegetables can smoothly enter the flexible harvesting opening without being easily damaged.

It should be particularly noted that a wall thickness of an upper part of the flexible body 31 is thinner than that of a lower part of the flexible body 31, and the mounting space of an upper part of the flexible body 31 is larger than that of a lower part of the flexible body 31, thus ensuring that the upper part of the flexible body 31 in an inflated positive pressure state expands more to squeeze each other to achieve the expansion of a swallowing type flexible harvesting opening; and the upper part of the flexible harvesting opening in an exhausted negative pressure state contracts more to provide a enough contraction force on the premise of ensuring dexterity, thus achieving full-envelope wrapping to the target fruit/vegetable 6.

The harvesting process is described below. As shown in FIG. 7, FIG. 8, FIG. 9 and FIG. 10, the flexible body 31 is exhausted first, the swallowing type flexible harvesting opening 313 contracts and moves close to a target strawberry. When the flexible harvesting opening 313 is aligned with the target strawberry, the flexible body 31 is inflated to open the flexible harvesting opening, such that the target strawberry can naturally fall into the flexible harvesting opening. Then, the flexible body 31 is rapidly exhausted to rapidly narrow the flexible harvesting opening to firmly fix the target strawberry. A slightly downward force is continuously applied by the driving member 2 to achieve break-off harvesting of the target strawberry by combining the resilience of the flexible body 31.

In an embodiment of the present disclosure, the flexible harvesting mechanism 3 can achieve full-envelope grasping to the target fruit/vegetable 6, thus avoiding pressing damage caused by the local extrusion of a clamping type gripper. The rigid member can provide enough bending rigidity to make the flexible body 31 have the rigidity of bending and harvesting. The flexible body 31 is small in overall size when contracting, but the flexible harvesting opening is large when the flexible body expands, thus supporting the flexible harvesting mechanism 3 to go deep into clusters of fruits and vegetables to harvest the target fruits/vegetables 6 with different sizes in a swallowing manner.

Figure 3:
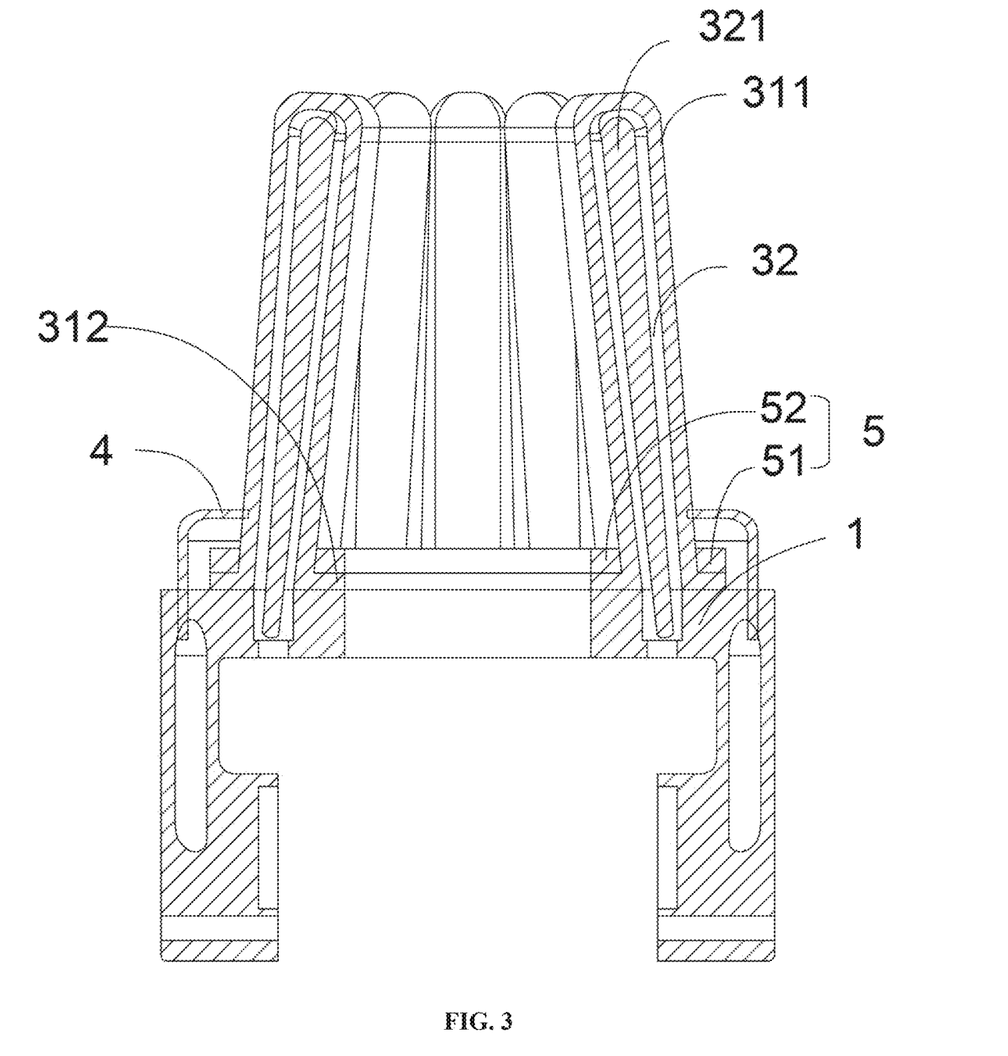
FIG. 3 is a sectional view of a flexible-rigid integrated gripper for harvesting fruits and vegetables in a breaking-off manner according to the present disclosure.

In alternative embodiments, as shown in FIG. 1, FIG. 2 and FIG. 3, the flexible body 31 includes multiple flexible cavity bodies 311 which are circumferentially arranged. The rigid member includes multiple rigid rods 321, each flexible cavity body 311 is provided with a flexible chamber, and each rigid rod 321 is arranged in the corresponding flexible chamber.

Specifically, the flexible body 31 is composed of multiple independent flexible cavity bodies 311, and these flexible cavity bodies 311 are circumferentially distributed around a center point. Each flexible cavity body 311 is an independent sealing unit, and has an independent inflation/exhausting interface, such that each flexible cavity body 311 can be conveniently controlled to expand or contract individually. An outer wall of each flexible cavity body 311 is made of a high-resilient material, such as silica gel or polyurethane, and is internally provided with the flexible chamber. These flexible chambers expand when inflated and contract when exhausted, thus changing the shapes and sizes thereof. Front ends, away from the base 1, of the flexible cavity bodies 311 jointly form the annular flexible harvesting opening 313. This flexible harvesting opening is enlarged during inflation to facilitate the entering of the fruits and vegetables, and narrowed during exhausting to clamp the fruits and vegetables. The shape and size of the flexible harvesting opening 313 can be adjusted according to the type and size of the target fruit/vegetable 6, thus achieving the optimal harvesting effect.

In addition, the rigid member is composed of multiple rigid rods 321, and each rigid rod 321 corresponds to one flexible cavity body 311 in the flexible body 31. One end of each rigid rod 321 is fixed to a bottom wall of the flexible chamber, and the other end of each rigid rod is freely suspended or connected to other structures (such as a supporting frame), thus maintaining the shape and position of the flexible body 31 when deformed.

During actual application, an outer diameter of the rigid rod 321 is slightly smaller than an inner diameter of the flexible chamber, and there is an enough gap 32 between the rigid rod 321 and the flexible chamber, facilitating filling gas.

It should be particularly noted that each flexible cavity body 311 is independently inflated or exhausted through an external gas pump, or a manual pump. According to the position and size of the target fruit/vegetable 6, some of all flexible cavity bodies 311 can be selectively controlled to be expanded or contracted, thus achieving more accurate harvesting.

In embodiments of the present disclosure, when the flexible harvesting opening 313 is aligned with the target fruit/vegetable 6, all flexible cavity bodies 311 are inflated to enlarge the flexible harvesting opening and guide the fruit/vegetable to enter the flexible harvesting opening. Once the fruit/vegetable is completely wrapped into the flexible harvesting opening, part or all of the flexible cavity bodies 311 are immediately exhausted. The flexible cavity bodies 311 contract to clamp the fruit/vegetable when exhausted. Afterwards, a slightly downward force can be continuously applied by the driving member 2 to achieve break-off harvesting of the fruit/vegetable.

In alternative embodiments, as shown in FIG. 3, in the direction away from the base 1, a thickness of a side wall of the flexible cavity body 311 gradually decreases, the flexible chamber gradually increases, a diameter of the rigid rod 321 gradually increases, and a gap 32 is reserved between the periphery of the rigid rod 321 and an inner wall of the flexible chamber.

It should be particularly noted that a wall thickness of an upper part of each flexible body 311 is thinner than that of a lower part, and the chamber space of the upper part of each flexible body 311 is larger than that of the lower part. As such, it is guaranteed that the upper parts of the flexible cavity bodies 311 in an inflated positive pressure state expand more to squeeze each other, thus achieving the expansion of the swallowing type flexible harvesting opening, and the upper parts of the flexible cavity bodies 311 in an exhausted negative pressure state contract more to provide enough contraction force on the premise of guaranteeing dexterity, thus achieving full-envelope wrapping to the target fruit/vegetable 6. The rigid rod 321 is placed in one independent cavity body of the flexible cavity bodies 311, and the number of the rigid rods 321 can be provided as required, with the function of increasing the rigidity of the swallowing type flexible harvesting opening 313 when bent, thus ensuring the separation of the fruit/vegetable and a fruit stalk.

Exemplary, the flexible body 31 is composed of twelve independent flexible cavity bodies 311 in a gathering inwards arrangement. That is, the flexible cavity bodies 311 in an initial state are inclined, such that the contraction of the swallowing type flexible harvesting opening 313 in a normal state can be ensured, thus narrowing the overall size to improve the dexterity when harvesting clustered fruits/vegetables.

In alternative embodiments, as shown in FIG. 3, an outer side of each flexible cavity body 311 close to the base 1 is provided with a flange 312. The flexible-rigid integrated gripper for harvesting fruits and vegetables in a breaking-off manner further includes a fixing member 5, and the flange 312 is fixed to the base 1 through the fixing member 5.

It should be noted that the fixing member 5 includes an outer pressing ring 51 and an inner pressing ring 52. The inner pressing ring 52 is pressed against an inner side of the flange 312 of each flexible cavity body 311, and the outer pressing ring 51 is pressed against an outer side of the flange 312 of each flexible cavity body 311. Exemplary, the inner pressing ring 52, the inner side of the flange 312 and the base 1 are fixedly connected via bolts, thus preventing the gas in the flexible cavity bodies 311 from leaking during inflation and exhausting.

In alternative embodiments, a gas vent hole is formed in the bottom of each flexible cavity body 311 and in communication with the flexible chamber. Multiple first gas inlet holes 11 are formed in the base 1, and in communication with the multiple gas vent holes one by one.

It should be particularly noted that when the bottom of the flexible cavity body 311 is provided with the gas vent hole, the bottom of the rigid rod 321 can extend into the first gas inlet hole 11. In this case, it is necessary to ensure that the rigid rod 321 is free of blocking an orifice of the first gas inlet hole 11.

In alternative embodiments, one end, away from the base 1, of each flexible cavity body 311 is arranged in an arc shape.

Specifically, one end, away from the base 1, of each flexible cavity body 311 (i.e., a front end or a harvesting end) is in an arc shape. The arc design not only conforms to the natural shape of most fruits/vegetables, such as a circuit or oval fruit, but also can provide more uniform and soft contact force in the harvesting process, thus reducing the damage to the fruits and vegetables.

A curvature radius of the arc is determined according to the average size of the target fruit/vegetable 6. For small fruits/vegetables (such as strawberries), the curvature radius may be small. For large fruits/vegetables (such as tomatoes or apples), the curvature radius should be correspondingly increased. A length of the arc also needs to be adjusted according to the overall size of the flexible harvesting opening and the size of the fruit/vegetable. The length of the arc should be long enough to ensure that the fruit/vegetable can be completely wrapped, but should not be too long to avoid unnecessary material waste and weight increase. A height of the arc is a vertical distance of the arc from the lowest point to the highest point. This height of the arc should be slightly greater than the maximum diameter of the fruit/vegetable, thus ensuring that the fruit/vegetable can smoothly enter the flexible harvesting opening and be clamped.

In addition, an arc part of the flexible cavity body 311 is made of a material with high resilience and wear resistance, such as silica gel, or high-grade polyurethane. These materials not only have good flexibility, but also can maintain stable shape and performance during long-term use. The arc part of the flexible cavity body 311 can be manufactured by an injection molding, vacuum pouring, or other methods. These processes can improve the production efficiency while ensuring the accuracy and consistence of the arc part.

In alternative embodiments, as shown in FIG. 1, FIG. 2, FIG. 3 and FIG. 4, the flexible-rigid integrated gripper for harvesting fruits and vegetables in a breaking-off manner further includes a blowing hood 4 mounted on the base 1. The blowing hood 4 is arranged around an outer side surface of the flexible body 31. When the blowing hood 4 is ventilated, the gas can flow on the outer side surface of the flexible body 31 in the direction away from the base 1.

It should be noted that the function of the blowing hood 4 is to change an outflow direction of gas, such that the gas can be uniformly ejected outward along the outer side surface of the flexible body 31 to blow away obstacles such as leaves 8 of fruits and vegetables, such that the flexible harvesting opening 313 can swallow the target more easily without being hindered by surrounding obstacles. The position change of the target possibly connected to the fruit stalk of the obstacle caused by a situation that the gripper is adhered to the surrounding obstacle when swallowing the target can be avoided.

In an alternative embodiment, a second gas inlet hole 12 is formed in the base 1, and in communication with the inside of the blowing hood 4.

It should be noted that the blowing hood may be provided with gas blowing holes, the gas blowing holes face the outer side surface of the flexible body 31, such that the gas blown out from the inside of the blowing hood 4 can be uniformly ejected outwards along the outer side surface of the flexible body 31, thus blowing away obstacles such as leaves 8 of fruits and vegetables. Exemplary, the blowing hood 4 can be inflated through an external gas pump, or a manual pump.

In alternative embodiments, as shown in FIG. 1 and FIG. 4, the driving member 2 includes a rotating motor, and the base 1 is provided with a first side and a second side opposite to each other. The flexible harvesting mechanism 3 is arranged on the first side, and the rotating motor is mounted on the second side. Under the driving of the rotating motor, the base 1 can drive the flexible harvesting mechanism 3 to rotate.

It should be noted that the swallowing type flexible harvesting opening 313 contracts and gets close to the target fruit/vegetable 6, then the first gas inlet 11 is inflated with a positive pressure gas to expand the flexible harvesting opening 313 to swallow the target fruit/vegetable 6. Then the positive pressure gas is switched to a negative pressure, the flexible harvesting opening 313 contracts to completely envelope the target fruit/vegetable 6, and the fruit stalk is finally bent under the action of the rotating motor to separate the target fruit/vegetable 6 from the fruit stalk. During this process, a second gas inlet hole 12 is always inflated with a high-pressure gas, and the high-pressure gas is ejected through a clearance between the blowing hood 4 and the outer side of the flexible body 31, thus blowing away obstacles such as surrounding fruits/vegetables 7 and leaves 8 around the target fruit/vegetable 6.

In embodiments of the present disclosure, the swallowing type flexible harvesting opening 313 of the flexible-rigid integrated gripper for harvesting fruits and vegetables in a breaking-off manner is formed by pouring a flexible material, which is in flexible contact with the target fruit/vegetable 6. A full-enveloping contact mode and the flexible material ensure that the target fruit/vegetable 6 will not be damaged. The rigid member is placed inside the flexible body 31 to enhance the bending rigidity of the flexible body 31, which is enough to support the flexible body 31 to provide enough bending force to separate the fruit/vegetable from the fruit stalk. The opening size of the flexible harvesting opening 313 can be changed by controlling the gas pressure. Under the negative pressure, the opening size of the flexible harvesting opening 313 is small, and the flexible harvesting opening 313 is flexible. Under the positive pressure, the opening size of the flexible harvesting opening 313 is related to the pressure, which can achieve the envelope grasping of fruits/vegetables with different sizes. By adjusting an appropriate gas pressure, obstacles such as leaves 8 can be blown away without affecting the harvesting of the target fruit/vegetable 6. Meanwhile, the high-pressure gas uniformly ejected from the outside of the swallowing type flexible harvesting opening can prevent the flexible harvesting mechanism 3 from adhering to the surrounding obstacles such as fruits/vegetables 7, and the target fruit/vegetable 6 from adhering to the surrounding obstacles such as fruits/vegetables 7, thus improving the swallowing success rate of the flexible harvesting opening 313.

In addition, the present disclosure provides a harvesting robot, including a moving platform, and the flexible-rigid integrated gripper for harvesting fruits and vegetables in a breaking-off manner described above. The driving member 2 is mounted on the moving platform.

The moving platform may include a bottom traveling mechanism, a lifting mechanism, and a navigation device. The lifting mechanism is fixedly connected onto a top plane of the bottom traveling mechanism, and the navigation device is fixedly connected to a front end of the bottom traveling mechanism. The bottom traveling mechanism is a guide-rail type traveling mechanism. Through close contact between wheels of the traveling mechanism and a guide rail laid on a passage, the harvesting robot can stably run on the guide rail. The function of the lifting mechanism is to adjust a height of the driving member 2, thus achieving harvesting at different heights.

Specifically, as the harvesting robot includes the flexible-rigid integrated gripper for harvesting fruits and vegetables in a breaking-off manner above, a specific structure of the flexible-rigid integrated gripper for harvesting fruits and vegetables in a breaking-off manner may refer to the above embodiments, and the harvesting robot shown in this embodiment includes all technical solutions of the above embodiment, and at least have all beneficial effects obtained by all technical solutions above, and thus will not be described in detail here.

Finally, it should be noted that the above embodiments are only used to illustrate the technical solution of the present disclosure rather than limiting. Although the present disclosure has been described in detail with reference to the foregoing embodiments, those of ordinary skill in the art should understand that it is still possible to modify the technical solution described in the foregoing embodiments, or to replace some technical features with equivalents. However, these modifications or substitutions do not make the essence of the corresponding technical solutions deviate from the spirit and scope of the technical solutions of various embodiments of the present disclosure.

What is claimed is:

1. A flexible-rigid integrated gripper for harvesting fruits and vegetables in a breaking-off manner, comprising:
   a base,
   a driving member connected to the base, and
   a flexible harvesting mechanism, the flexible harvesting mechanism comprises:
      a rigid member; and
      a flexible body arranged on the base and internally provided with a mounting space in fit with the rigid member, wherein the rigid member is arranged in the mounting space, and wherein in a direction away from the base, a thickness of a side wall of the flexible body gradually decreases, the mounting space gradually increases, and a flexible harvesting opening in fit with a fruit/vegetable is formed by an inner side surface of the flexible body;
   when the flexible body is exhausted, a size of the flexible harvesting opening gradually reduces in the direction away from the base; and when the flexible body is inflated, the size of the flexible harvesting opening gradually increases in the direction away from the base; and
   the driving member is configured to drive the base to move, thus harvesting a fruit/vegetable inside the flexible harvesting opening;
   wherein the flexible body comprises a plurality of independent flexible cavity bodies which are circumferentially arranged around a central point, each of the flexible cavity bodies is an independent sealing unit and has an independent inflation and exhausting interface; the rigid member comprises a plurality of rigid rods, each of the rigid rods corresponds to a corresponding one of the flexible cavity bodies in the flexible body, each of the flexible cavity bodies is provided with a flexible chamber which is internally arranged with a corresponding one of the rigid rods, one end of the corresponding one of the rigid rods is fixed to a bottom wall of the flexible chamber and an other end of the corresponding one of the rigid rods is freely suspended or connected to a supporting frame; and wherein in the direction away from the base, a thickness of a side wall of each of the flexible cavity bodies gradually decreases, the flexible chamber gradually increases, a diameter of each of the rigid rods gradually increases; and a gap is reserved between a periphery of the corresponding one of the rigid rods and an inner wall of the flexible chamber.

2. The flexible-rigid integrated gripper for harvesting fruits and vegetables in a breaking-off manner according to claim 1, wherein an outer side, close to the base, of each of the flexible cavity bodies is provided with a flange, the gripper for harvesting fruits and vegetables in a breaking-off manner further comprises a fixing member, and the flange is fixed to the base through the fixing member.

3. The flexible-rigid integrated gripper for harvesting fruits and vegetables in a breaking-off manner according to claim 1, wherein a gas vent hole is formed in a bottom of each of the flexible cavity bodies, and is in communication with the flexible chamber; a plurality of first gas inlet holes are formed in the base, and gas vent holes are correspondingly in communication with the plurality of first gas inlet holes one by one.

4. The flexible-rigid integrated gripper for harvesting fruits and vegetables in a breaking-off manner according to claim 1, wherein one end, away from the base, of each of the flexible cavity bodies is arranged in an arc shape.

5. The flexible-rigid integrated gripper for harvesting fruits and vegetables in a breaking-off manner according to claim 1, further comprising a blowing hood mounted on the base and arranged around an outer side surface of the flexible body such that when the blowing hood is ventilated, a gas is able to flow on the outer side surface of the flexible body in the direction away from the base.

6. The flexible-rigid integrated gripper for harvesting fruits and vegetables in a breaking-off manner according to claim 5, wherein a second gas inlet hole is formed in the base, and is in communication with an inside of the blowing hood.

7. The flexible-rigid integrated gripper for harvesting fruits and vegetables in a breaking-off manner according to claim 1, wherein the driving member comprises a rotating motor, and the base is provided with a first side and a second side opposite to each other; the flexible harvesting mechanism is arranged on the first side, and the rotating motor is mounted on the second side, and the base is able to drive the flexible harvesting mechanism to rotate under driving of the rotating motor.

8. A harvesting robot, comprising a moving platform, and the flexible-rigid integrated gripper for harvesting fruits and vegetables in a breaking-off manner according to claim 1, wherein the driving member is mounted on the moving platform.

9. The flexible-rigid integrated gripper for harvesting fruits and vegetables in a breaking-off manner according to claim 8, wherein an outer side, close to the base, of each of the flexible cavity bodies is provided with a flange, the gripper for harvesting fruits and vegetables in a breaking-off manner further comprises a fixing member, and the flange is fixed to the base through the fixing member.

10. The flexible-rigid integrated gripper for harvesting fruits and vegetables in a breaking-off manner according to claim 8, wherein a gas vent hole is formed in a bottom of each of the flexible cavity bodies, and is in communication with the flexible chamber; a plurality of first gas inlet holes are formed in the base, and gas vent holes are correspondingly in communication with the plurality of first gas inlet holes one by one.

11. The flexible-rigid integrated gripper for harvesting fruits and vegetables in a breaking-off manner according to claim 8, wherein one end, away from the base, of each of the flexible cavity bodies is arranged in an arc shape.

12. The flexible-rigid integrated gripper for harvesting fruits and vegetables in a breaking-off manner according to claim 8, further comprising a blowing hood mounted on the base and arranged around an outer side surface of the flexible body, such that when the blowing hood is ventilated, a gas is able to flow on the outer side surface of the flexible body in the direction away from the base.

13. The flexible-rigid integrated gripper for harvesting fruits and vegetables in a breaking-off manner according to claim 12, wherein a second gas inlet hole is formed in the base, and is in communication with an inside of the blowing hood.

14. The flexible-rigid integrated gripper for harvesting fruits and vegetables in a breaking-off manner according to claim 8, wherein the driving member comprises a rotating motor, and the base is provided with a first side and a second side opposite to each other; the flexible harvesting mechanism is arranged on the first side, and the rotating motor is mounted on the second side; and the base is able to drive the flexible harvesting mechanism to rotate under driving of the rotating motor.

* * * * *